United States Patent Office 2,703,327
Patented Mar. 1, 1955

2,703,327
21-ACYLOXY-4-PREGNENE-3,6,20-TRIONES

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952,
Serial No. 296,739

6 Claims. (Cl. 260—397.47)

The present invention relates to the preparation of novel steroids, and is more particularly concerned with a novel method for the production of 21-acyloxy-4-pregnene-3,6,20-triones and with the products thus produced.

The novel compounds of the present invention represented by the following formula:

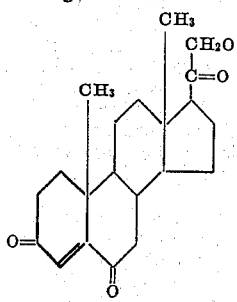

are prepared by reacting 21-acyloxy-6β-hydroxy-4-pregnene-3,20-diones with an oxidizing agent. The starting compounds may be prepared by exposing 21-hydroxy-4-pregnene-3,20-dione (11 desoxycorticosterone) to the oxygenating action of a culture of fungus of the order Mucorales as described in our applications, of which this is a continuation-in-part, Serial No. 180,496, filed August 19, 1950, now abandoned, and Serial No. 272,944, filed February 23, 1952, issued July 8, 1952, as Patent No. 2,602,769, and thereafter esterifying the thus-produced novel 6β,21-dihydroxy-4-pregnene-3,20-dione to produce a novel 21-acyloxy-6β-hydroxy-4-pregnene-3,20-dione.

It is an object of this invention to provide novel 21-acyloxy-4-pregnene-3,6,20-triones and a novel process for the production thereof. Other objects will be apparent to those skilled in the art to which this invention pertains.

The novel compounds of the present invention have exhibited desirable pharmacological properties. The compounds have demonstrated progesterone, anti-glucocorticoid, anti-hypertensive, salt retention, and anaesthetic activities.

In carrying out the process of the present invention, the starting 21-acyloxy-6β-hydroxy-4-pregnene-3,20-dione is dissolved in a solvent such as, for example, glacial acetic acid, and oxidized with a suitable oxidizing agent such as, for example, potassium permanganate, N-bromosuccinimide, chromic acid, and others. Chromium trioxide has also been found to be a satisfactory oxidizing agent for converting the 6β-hydroxy group to a 6-keto group in high yields without concomitantly affecting other parts of the molecule. The oxidizing agent is usually used in a proportion of about one equivalent per mole of steroid although other proportions are within the scope of the present invention. The oxidation is usually conducted at about room temperature although other temperatures between about zero degrees centigrade and the boiling point of the reaction mixture may also be employed. The reaction time may be varied with the oxidizing agent and the temperature employed. The solvent may then be removed by distillation under vacuum and the product precipitated by the addition of water which concomitantly dissolves any inorganic salts present. The resulting 21-acyloxy-4-pregnene-3,6,20-trione may then be purified by filtration and subsequent recrystallization from a suitable solvent such as, for example, isopropyl alcohol, or chromatographic separation according to methods known to the art.

The following examples are illustrative of the process and products of the present invention, but are not to be construed as limiting.

PREPARATION 1.—6β,21-DIHYDROXY-4-PREGNENE-3,20-DIONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Two liters of this sterilized medium was inoculated with *Rhizopus arrhizus*, ATCC 11145, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of *Rhizopus arrhizus* was added one gram of 21-hydroxy-4-pregnene-3,20-dione (11-desoxycorticosterone) in 25 milliliters of acetone to provide a suspension of the steroid in the culture. After an additional 41.5 hour period of incubation under the same conditions of temperature and aeration, the beer and mycelium were extracted. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The residue was dissolved in ether, concentrated until light tan crystals precipitated and then filtered. The crystals, 152.7 milligrams, were dissolved in hot chloroform, filtered, and Skellysolve B, petroleum ether, was added to the hot solution until precipitation began. Upon cooling there was thus-precipitated 37.8 milligrams of 6β,21-dihydroxy-4-pregnene-3,20-dione melting at 180 to 189 degrees centigrade. The melting point was raised to 190 to 192 degrees centigrade by recrystallization from isopropanol and Skellysolve B. Infrared spectrum analysis confirmed the structure.

*Analysis.*—Calculated for $C_{21}H_{31}O_4$: C, 72.80; H, 8.73. Found: C, 72.44; H, 8.85.

PREPARATION 2.—21-ACETOXY-6β-HYDROXY-4-PREGNENE-3,20-DIONE

A 25 milligram portion of 6β,21-dihydroxy-4-pregnene-3,20-dione, melting at 184–188 degrees centigrade was dissolved in 0.5 milliliters of pyridine containing 8.1 milligrams (1.1 molar equivalents) of acetic anhydride, whereafter the whole was maintained overnight at room temperature. The reaction mixture was then diluted with eight milliliters of water to precipitate crystals of 21-acetoxy-6β-hydroxy-4-pregnene-3,20-dione. The precipitation was completed upon cooling the reaction mixture to four degrees centigrade for eight hours and the thus-precipitated product was separated by centrifuging and decanting the supernatant liquid. The crystals were thoroughly washed with water and dried. There was thus-obtained 22.1 milligrams (a yield of 76 percent of the theoretical) of product melting at 173–183 degrees centigrade and 21-acetoxy-6β-hydroxy-4-pregnene-3,20-dione, melting at 184–188 degrees centigrade, was obtained upon dissolving the crystals thus-obtained in isopropyl alcohol, filtering, adding 1.5 milliliters of Skellysolve B, petroleum ether, to the filtrate, and thereafter washing the precipitated crystals with ether, ethyl acetate, and Skellysolve B, respectively. Infrared spectrum analysis verified the theoretical structure.

In a similar manner, other 21-acyloxy esters of 6β,21-dihydroxy-4-pregnene-3,20-dione are prepared by reacting 6β,21-dihydroxy-4-pregnene-3,20-dione with a selected acid anhydride in pyridine or with another acylating agent such as, for example, ketene, a ketene of a selected acid, an acid chloride, an acid, acid anhydride, and other agents in pyridine or other suitable solvent, to produce the desired 21-acyloxy ester of 6β,21-dihydroxy-4-pregnene-3,20-dione. Representative esters thus-produced include one to eight carbon atom carboxylic acid acyloxy esters of saturated and unsaturated aliphatic or cycloaliphatic, carbocyclic, aryl, arylalkyl, alkaryl, mono-, di-, or poly-carboxylic acids, which form ester groups such as, for example, formyloxy, acetoxy, propionyloxy, butyryloxy, valeryloxy, hexanoyloxy, heptanoyloxy, octanoyloxy, benzoxy, phenylacetoxy, toluoyloxy, napthoyloxy, cyclopentylformyloxy, β-cyclopentylpropionyloxy, acrylyloxy, cyclohexylformyloxy, the half and di-esters of malonic, maleic, succinic, glutaric and adipic acids, and the like. The acids may also contain non-interfering substituents, such as mono- or poly-halo, chloro, bromo, hydroxy, methoxy, and the like.

*Example 1.—21-acetoxy-4-pregnene-3,6,20-trione*

To a solution of 18.6 milligrams (0.546 millimole) of 21-acetoxy-6β-hydroxy-4-pregnene-3,20-dione in one milliliter of glacial acetic acid previously distilled over chromium trioxide was added at room temperature 5.77 milligrams (0.577 millimole) of chromium trioxide dissolved in 0.63 milliliter of glacial acetic acid. After three hours, the solvent was removed by distillation in vacuum leaving about 0.3 milliliter of residue which was diluted with five milliliters of water. The thus-precipitated 21-acetoxy-4-pregnene-3,6,20-trione was filtered, washed with water and dried in a vacuum oven and found to weigh nineteen milligram.

*Example 2.—21-propionyloxy-4-pregnene-3,6,20-trione*

In the same manner as given in Example 1, 21-propionyloxy-4-pregnene-3,6,20-trione is prepared by reacting 21 - propionyloxy-6β-hydroxy-4-pregnene-3,20-dione with chromium trioxide in acetic acid.

*Example 3.—21-β-cyclopentylpropionyloxy-4-pregnene-3,6,20-trione*

In the same manner as given in Example 1, 21-β-cyclopentylpropionyloxy-4-pregnene-3,6,20-trione is prepared by reacting 21-β-cyclopentylpropionyloxy-6β-hydroxy-4-pregnene-3,20-dione with chromium trioxide in acetic acid.

*Example 4.—21-octanoyloxy-4-pregnene-3,6,20-trione*

In the same manner as given in Example 1, 21-octanoyloxy-4-pregnene-3,6,20-trione is prepared by reacting 21-octanoyloxy-6β-hydroxy-4-pregnene-3,20-dione with chromium trioxide in acetic acid.

*Example 5.—21-benzoxy-4-pregnene-3,6,20-trione*

In the same manner as given in Example 1, 21-benzoxy-4-pregnene-3,6,20-trione is prepared by reacting 21-benzoxy-6β-hydroxy-4-pregnene-3,20-dione with chromium trioxide in acetic acid.

In a similar manner as given in Example 1, upon reacting other 21 - acyloxy - 6β - hydroxy-4-pregnene-3,20-diones with chromium trioxide in acetic acid or other oxidizing agent in another inert solvent there is thus-produced other 21-acyloxy-4-pregnene-3,6,20-triones wherein the acyloxy group has the formula AcO, Ac being the residue of acids such as, for example, formic, butyric, valeric, hexanoic, heptanoic, phenylacetic, toluic, napthoic, cyclopentylformic, cyclohexylformic, trimethylacetic, malonic, maleic, succinic, glutaric and adipic, wherein these acids may also contain non-interfering substituents, such as, for example, mono- or poly-halo, chloro, bromo, hydroxy, methoxy, and the like.

The compounds of the present invention have also shown utility as chemical intermediates. In the preparation of estrogenically active 6-ketoprogesterone [Ehrenstein, J. Org. Chem., 4, 506 (1939)] the compounds of the present invention can be saponified to introduce the 21-hydroxyl, reacted with paratoluenesulfonyl chloride, and sodium iodide added to give the iodo ketone which on reduction with zinc yields 6-ketoprogesterone.

It is to be understood that the invention is not to be limited to the exact details of operations or exact compounds shown and described as obvious modifications and equivalents will be apparent to one skilled in the art and the invention is therefore to be limited only by the scope of the appended claims.

We claim:
1. A 21-acyloxy-4-pregnene-3,6,20-trione wherein the acyloxy group has the formula AcO, Ac being the acyl radical of a carboxylic acid containing from one to eight carbon atoms, inclusive, and selected from the group consisting of aliphatic acids and carbocyclic acids.
2. 21-acetoxy-4-pregnene-3,6,20-trione.
3. 21-propionyloxy-4-pregnene-3,6,20-trione.
4. 21 - β - cyclopentylpropionyloxy - 4 - pregnene - 3,6,20 - trione.
5. 21-octanoyloxy-4-pregnene-3,6,20-trione.
6. 21-benzoxy-4-pregnene-3,6,20-trione.

References Cited in the file of this patent
UNITED STATES PATENTS

| | | |
|---|---|---|
| 2,312,481 | Reichstein | Mar. 2, 1943 |
| 2,352,848 | Marker | July 4, 1944 |
| 2,359,772 | Marker | Oct. 10, 1944 |

OTHER REFERENCES

Steiger et al., Helv. Chim. Acta 20, 1164–79 (1937).